US012372335B2

(12) United States Patent
Caplan

(10) Patent No.: US 12,372,335 B2
(45) Date of Patent: Jul. 29, 2025

(54) PLASMA BURST APPLICATION SYSTEM AND METHOD

(71) Applicant: APTinfo B.V., Haarlem (NL)

(72) Inventor: William Duane Caplan, The Hague (NL)

(73) Assignee: APTINFO B.V., Haarlem (NL)

( * ) Notice: Subject to any disclaimer, the term of this patent is extended or adjusted under 35 U.S.C. 154(b) by 344 days.

(21) Appl. No.: 17/909,150

(22) PCT Filed: Feb. 19, 2021

(86) PCT No.: PCT/EP2021/054161
§ 371 (c)(1),
(2) Date: Sep. 2, 2022

(87) PCT Pub. No.: WO2021/175619
PCT Pub. Date: Sep. 10, 2021

(65) Prior Publication Data
US 2023/0087750 A1    Mar. 23, 2023

(30) Foreign Application Priority Data

Mar. 5, 2020  (NL) .................................. 2025053

(51) Int. Cl.
*F41H 13/00*  (2006.01)
*H05H 1/24*  (2006.01)
*G02B 26/08*  (2006.01)
(52) U.S. Cl.
CPC ........... *F41H 13/0062* (2013.01); *H05H 1/24* (2013.01); *G02B 26/0875* (2013.01)

(58) Field of Classification Search
CPC .............. F41H 13/0043; F41H 13/005; F41H 13/0056; F41H 13/0062; G02B 26/0875;
(Continued)

(56) References Cited

U.S. PATENT DOCUMENTS 6,021,975 A * 2/2000 Livingston ............ G01S 7/4811
244/3.13
6,145,784 A * 11/2000 Livingston .............. G01S 17/86
89/41.06
(Continued)

OTHER PUBLICATIONS

Wei, Long-distance propagation of intense short laser pulse in air, Physics of Plasmas, Nov. 1, 2004. pp. 5360-5363, vol. 11, No. 11.
(Continued)

*Primary Examiner* — Erin Kryukova
(74) *Attorney, Agent, or Firm* — MH2 Technology Law Group, LLP

(57) ABSTRACT

The present disclosure concerns a method and plasma burst application system for applying a plasma burst to a target object at a target location, the system comprising a terawatt femtosecond pulsed laser for emitting femtosecond laser pulses; a distance obtaining unit configured to obtain a target distance to the target location; and one or more controllers configured to receive the obtained target distance; set one or more laser control parameters of the terawatt femtosecond pulsed laser according to the obtained target distance such that, when a laser pulse is emitted by the terawatt femtosecond pulsed laser, the laser pulse collapses at a selected laser pulse propagation distance substantially equal to the obtained target distance, and control the emission of at least one laser pulse towards the target location such that the laser pulse collapses at substantially the target location in order to apply the plasma burst at the target location.

24 Claims, 10 Drawing Sheets

(58) Field of Classification Search
CPC ..... H05H 1/24; F42H 13/0043; F42H 13/005; F42H 13/0056; F42H 13/0062
See application file for complete search history.

(56) References Cited

U.S. PATENT DOCUMENTS

| | | | | |
|---|---|---|---|---|
| 7,046,187 | B2* | 5/2006 | Fullerton | F41H 11/00 342/21 |
| 7,978,313 | B2* | 7/2011 | Guthrie | G01S 17/66 356/4.01 |
| 8,203,109 | B2* | 6/2012 | Taylor | G01S 7/4812 250/203.2 |
| 8,927,935 | B1* | 1/2015 | Meline | F41H 13/0062 250/340 |
| 10,104,756 | B1 | 10/2018 | Chang | |
| 10,760,879 | B2* | 9/2020 | Stark | F41H 13/0093 |
| 2003/0233931 | A1* | 12/2003 | Nemtsev | F41H 13/0062 89/1.11 |
| 2016/0097616 | A1 | 4/2016 | Weigold | |
| 2017/0127507 | A1* | 5/2017 | Hunt | H05H 1/46 |
| 2018/0080747 | A1* | 3/2018 | Nishikata | F41H 13/0093 |
| 2018/0092195 | A1* | 3/2018 | Nishikata | H05H 1/24 |
| 2020/0041236 | A1 | 2/2020 | Hening | |

OTHER PUBLICATIONS

Kalisky, Applications and performance of high power lasers and in the battlefield, Optical Materials, Apr. 7, 2001, vol. 34, No. 2, Elsevier Science Publishers BV, Amsterdam, NL.

Durand, Kilometer range filamentation, Optics Express, Nov. 4, 2013, vol. 21, No. 22.

Kolesik, Conditional Femtosecond Pulse Collapse for White-Light and Plasma Delivery to a Controlled Distance, Optics Letters, Sep. 15, 2007, pp. 2753-2755, vol. 32, No. 18, Optical Society of America, United States.

Fibich, Control of the collapse distance in atmospheric propagation References and links. Optics Express, Jan. 1, 2006, pp. 51-53.

Wille, Teramobile: A Mobile Femtosecond-Terawatt Laser and Detection System, European Physical Journal Applied Physics, Dec. 1, 2002, pp. 183-190, vol. 20, No. 3, EDP Sciences, Les Ulis, France.

Rodriguez et al., Femtosecond LIDAR: new perspectives of atmospheric remote sensing, Institut fur Experimentalphysik, Freie Universitat, Berlin, Germany.

\* cited by examiner

PLASMA BURST APPLICATION SYSTEM AND METHOD

The present disclosure concerns a method and plasma burst application system for applying a plasma burst to a target object at a target location. The present disclosure in particular relates to a method and plasma burst application system for applying a plasma burst to an airborne target object that has electronic components and/or is radiographically controlled.

Radiographically controlled flying objects like drones are presently commonly available to consumers and professionals. These objects can, however, be used at locations such as airports where the airborne object disrupts the airport traffic, causing aircraft to be grounded and passengers and cargo to be delayed, resulting in at least economical damage.

In order to remove drones from such locations, it is an option to use guns or other means, but the use of such equipment may result in unsafe situations.

US 2016/097616 A1 concerns a laser guided and powered directed energy weapon that combines two different lasers to deliver a high energy electromagnetic pulse (EMP) to a target at long range. Such a weapon can not be used at airports to remove drones, as it delivers a high energy EMP, which is unsafe.

It is an object, among objects, of the present patent disclosure to provide for improved means of removing airborne target objects such as drones from a location.

According to a first aspect, there is provided a plasma burst application system for applying a plasma burst to a target object at a target location, the system comprising a terawatt femtosecond pulsed laser for emitting femtosecond laser pulses; a distance obtaining unit configured to obtain a target distance to the target location; and one or more controllers configured to receive the obtained target distance; set one or more laser control parameters of the terawatt femtosecond pulsed laser according to the obtained target distance such that, when a laser pulse is emitted by the terawatt femtosecond pulsed laser, the laser pulse collapses substantially at a selected laser pulse propagation distance based on to the obtained target distance, and control the emission of at least one laser pulse towards the target location such that the laser beam collapses at substantially the selected laser pulse propagation distance in order to apply the plasma burst at or near the target location.

The femtosecond laser pulse propagates through the atmosphere in a nonlinear manner. When the beam collapses it creates a plasma burst in the air. The plasma burst has associated effects of an acoustic shock and an electromagnetic pulse. The plasma burst applied near to the airborne object such as a drone will therefore disrupt, disable and/or damage the electronics and/or radiofrequency communications and disrupt the flight controls, causing the drone to crash and/or move away from the unwanted area.

Since the femtosecond laser pulse collapses at a controlled position, there is no danger of the laser pulse reaching any position outside of the target location, making the system inherently safe. For instance, when the laser pulse is directed into the air, aircraft flying in a direct line of sight of the laser pulse have no chance of being hit, since the path length of the laser pulse is then set to reach the target location, and the laser will not propagate further.

Preferably, the emission of at least one laser pulse towards the target location is controlled such that the laser beam collapses at the selected laser pulse propagation distance in order to apply the plasma burst at or near the target location. Near the target location preferably indicates that the plasma burst is applied at a position near the target location such that the plasma burst reaches the target object.

More preferred, the emission of at least one laser pulse towards the target location is controlled such that the laser beam collapses at the target distance in order to apply the plasma burst at or near the target location.

The selected laser pulse propagation distance may be substantially equal to the target distance. Preferably, the selected laser pulse propagation distance is equal to the target distance.

The distance obtaining unit can be a distance determining unit configured to determine the target distance to the target location.

In some embodiments, the present disclosure concerns a laser system which operates using ultra short pulses (USP) such that the propagation of light through a transparent medium (air) proceeds in an unconventional manner. The type of laser is typically referred to as a femtosecond pulsed laser. The laser pulse forms small filaments in the medium that are self-focusing due to the Kerr effect. When these filaments collapse the beam energy is deposited in the medium as a plasma pulse.

The system may use low energy as an advantage. Also, the plasma burst is controlled as to where it occurs in the medium. Preferably, a low energy laser beam controlled in three dimensional location to deliver a lower energy plasma burst very near to the desired target location is used. The effectiveness of the system can be increased by delivering multiple plasma bursts in a short time span (e.g. seconds) to achieve the above noted results. The effectiveness of the presently described system(s) is further enhanced by their use against target objects that typically are susceptible to |electromagnetic (EM) interference.

Femtosecond terawatt pulsed lasers known in the art have pulse energies in the order of millijoules, such as in the range of 1-800 mJ or 10-500 mJ.

The angular direction of the laser beam is controlled by a pointing and tracking system (PTS). The range at which the burst occurs is controlled by shaping the electronic and optical conditioning of the pulse such that the plasma burst occurs at the desired range.

The preferred USP femtosecond laser is an optical system with electronic and optical pulseforming components that creates femtosecond laser pulses with one or more of a controlled pulse shape, a controlled wave shape, a controlled energy, a controlled intensity vs. time profile, and controlled signal characteristics.

Although the majority of femtosecond lasers are Ti:sapphire technology, in the system of the present patent disclosure, lasers can be used with any wavelength. For instance, even a 10.6 µm $CO_2$ laser could be used. Preferably a laser wavelength outside of the spectral region of eye safety concerns, thus presenting only a small or no safety hazard, is used.

The femtosecond pulses travel through the atmosphere (or other medium) in a nonlinear manner different from conventional lasers. This nonlinear manner is commonly referred to as "filamentation" or the pulses comprising filaments.

When the filament propagation conditions break down or change, the laser light returns to conventional propagation conditions, which causes the creation of a plasma burst, spark or flare at a selected distance (range). The range of the filamentation breakdown can be controlled by electronic and optical control of the laser pulse. The optical system can include active optical assemblies. For example, the active optical assemblies may comprise one or more of deformable mirrors, mechanical positioning actuators, and spatial light modulators.

The plasma burst may cause the presence/creation of one or more of light, heat, ionized molecules, acoustic waves (and/or pressure waves and/or shock waves), and electromagnetic waves/energy.

In various embodiments, the system can be arranged for targeting of plasma filaments against various components of the (airborne) target object to cause one or more of:
  camera blinding;
  motor malfunction;
  aerodynamic surface damage/malfunction;
  antenna malfunction;
  device/release device/actuator malfunction;
  disturbance of aerodynamic control;
  disturbance of target electronic components and systems due to the presence of electrically conductive plasma;
  possible premature detonation of hostile drone explosive payload; and/or
  use of the optical/RF burst as part of an optical/RF gated viewing range measurement system.

In an embodiment, the system comprises a target direction determining unit configured to determine a target direction towards the target location from the terawatt femtosecond pulsed laser; and a laser pulse directioning unit configured to receive the determined target direction and to direct laser pulses emitted by the terawatt femtosecond pulsed laser towards the target location based on the determined target direction.

The target direction determining unit may be configured to receive coordinates of the target object. The target direction determining unit may additionally or alternatively be arranged to sense the target object in order to determine its location.

The target direction determining unit may be positioned at a distance from the rest of the system, e.g. from the terawatt femtosecond pulsed laser. This has the advantage that the target direction determining unit can be positioned at an optimal position for detecting and tracking the target object, while the laser can be positioned at a different suitable position, e.g. providing sufficient security and safety.

In another embodiment, the laser pulse directioning system additionally or alternatively is configured to:
  be in mechanical contact with the terawatt femtosecond pulsed laser and configured to move the terawatt femtosecond pulsed laser based on the determined target direction such that the laser pulses emitted by the terawatt femtosecond pulsed laser are directed towards the target location; and/or
  direct the emitted laser pulses using a movable laser pulse redirecting device. This has the advantage that less optics is required for directing the beam, since the whole laser is moved. This reduces the complexity of the control of the laser pulse propagation distance.

In yet another embodiment, the system alternatively or additionally comprises a tracking system comprising the distance obtaining unit and the target direction determining unit, wherein the tracking system is configured to:
  detect one or more respective locations of one or more objects in a field of regard, FOR, of the plasma burst application system; and
  determine whether a detected object is a target object or a protected object, the protected object being an object which is to be protected from laser pulses emitted by the plasma burst application system,
  wherein the one or more controllers are configured to receive the respective locations of the protected objects and to determine whether a laser pulse can be emitted or not based on the received respective locations of the protected objects, the determined target direction and the obtained target distance.

The protected object may for instance be a person. Since the locations of the protected objects are received, effectively a laser hazard volume is created wherein the laser pulse is allowed to propagate.

In a further embodiment, alternatively or additionally the one or more controllers are configured to determine that a laser pulse can not be emitted when the respective locations of the protected objects are within a predetermined distance of a laser pulse path along which laser pulses emitted by the terawatt femtosecond laser travel towards the target location.

In this way, more safety is provided as any protected object entering the path between the laser device and the target object results in the laser pulse not being emitted.

In another embodiment, alternatively or additionally the tracking system comprises a three dimensional sensing system configured to obtain a coordinates of sensed objects. The three dimensional sensing system may include a light detection and ranging, LiDAR, device and/or a range gated viewing camera.

Alternatively or additionally, in an embodiment, the laser controller is configured to
  control a pulse repetition frequency of the terawatt femtosecond pulsed laser;
  obtain a radio frequency or radio frequency band to be disrupted; and
  control the pulse repetition frequency according to the determined radio frequency or radio frequency band thereby causing radio frequency transmitters and/or receivers operating with the obtained radio frequency or radio frequency band at the target location to be disrupted upon collapse of the laser pulse substantially at the target location.

When the laser pulse interval (PRF, Pulse Repetition Frequency) is controlled, the PRF of the electromagnetic interference (EMI) emitted at the plasma burst can be used to spoof radio frequency receivers (e.g. GPS or GSM communications) on the target to create false (spoofing) emissions. The EMI is thus delivered to the target by the terawatt pulse and has a relatively low energy, and therefore the EMI has a relatively short effective range. This allows the system to be operated in public while staying within the allowed EM emission levels allowed by regulations.

The femtosecond laser pulse repetition frequency (PRF) may be controlled by the one or more controllers. Another way to disrupt the function of the target device is to control the PRF such that the EMP generated creates a modulated RF signal. In particular, the target device may have RF receiver components (such as GSM related communication components, GPS receivers, or other receivers).

The pulse pattern of the laser pulses emitted by the system may be programmed to specific frequencies that are similar to the RF signals that the target device is designed to receive. In this manner the pulse pattern can be used to "spoof" the target device by injecting unexpected signals in its receivers. This technique can thus be used to disrupt the function of the target device. Note that the RF signal levels required to spoof the target receivers is several or many orders of magnitude less than what is required for electronic upset. Therefore the TPS may be used to electronically spoof or jam the target receivers. An advantage of this technique is that the jamming signal originates at the plasma burst and is very near the device. The spoofing RF energy is very low and does not create RF or EMI hazards in the area of operation.

This is an advantage as compared to conventional RF spoofing devices used to counter (airborne) target objects such as drones. The RF emissions of these devices are strictly controlled by regulatory agencies in order to avoid interfering with normal RF communications of the public infrastructure. Therefore this conventional RF spoofing is very limited in range.

In a further embodiment of the system, the system further comprises a laser pulse collapse sensor configured to obtain a collapse distance of laser pulses emitted by the terawatt femtosecond pulsed laser, wherein the one or more controllers are configured to:

receive the collapse distance;

determine a difference between the collapse distance and the obtained target distance;

when the determined difference between the collapse distance and the obtained target distance exceeds a first threshold value, adapt the one or more laser control parameters such that the difference between the collapse distance and the obtained target distance is reduced.

The system may be implemented such that the azimuth-elevation position of the burst is detected by one sensor, and the range (distance) is detected by another.

The laser pulse collapse sensor may provide data on the actual range of the burst such that a comparison with the required range can be performed. Advantageously, real time feedback may be used to make adjustments to the laser system in order to correct for any discrepancies due to local atmospheric conditions or other factors that might create range discrepancies. This sensor can be implemented as a wide FOV sensor that detects the plasma burst and measures the range by the precise time of flight interval. Such precise timing may require calibration with the laser. The above may also provide other diagnostic information about the femtosecond laser pulse collapse. In addition to the optical emissions of the plasma burst, it is possible to evaluate time of flight range by sensing the RF (or terahertz) emission.

Other implementations may be combined with other sensor systems such as a LIDAR or range gated viewing sensor.

Preferably, the predetermined distance is reduced if the determined difference between the collapse distance and the obtained target distance is smaller than a second threshold value. In other words, once it is determined that the accuracy of the pulse collapse is improved, the predetermined distance can be reduced since there is a smaller chance of inadvertently going outside the intended path of the laser pulse.

Additionally or alternatively, the laser pulse collapse sensor is configured to detect the plasma bursts caused by collapse of the laser pulses, wherein the collapse distance is obtained based on respective time-of-flights of laser pulses and corresponding respective plasma bursts.

In an embodiment, the terawatt femtosecond pulsed laser comprises a femtosecond laser pulse generator for generating the femtosecond laser pulses.

Preferably, the terawatt femtosecond pulsed laser further comprises a defocusing lens for defocusing laser pulses emitted by the femtosecond laser pulse generator; a focusing lens for focusing the defocused laser pulses; and a distance adjuster for adjusting a distance between the defocusing lens and the focusing lens, wherein the laser control parameters comprise a distance between the focusing lens and the defocusing lens. This provides an advantageous way to control the collapse distance of the emitted laser pulses.

Additionally or alternatively, it is preferred that the terawatt femtosecond pulsed laser further comprises a first optical element for separating a generated laser pulse into a plurality of spectral components; a spatial light modulator positioned to receive the spectral components and configured to spatially modulate the spectral components; and a second optical element for combining the modulated spectral components into a modulated laser pulse, wherein the laser control parameters comprise spatial modulation parameters of the spatial light modulator. This provides another advantageous way to control the collapse distance of the emitted laser pulses. When combined with the controlling of the distance between the focusing lens and defocusing lens, an especially effective way of controlling the laser pulse collapse distance is obtained.

In a preferred embodiment, the first optical element is a first grating and the second optical element is a second grating, wherein the one or more controllers are configured to adapt respective first and second angles of the first and second gratings, wherein the laser control parameters comprise the first and second angles of respectively the first and second gratings.

In an embodiment, the terawatt femtosecond pulsed laser further comprises a deformable mirror configured to alter a phase profile of a wavefront of generated laser pulses. This provides an additional way to control the collapse distance of the emitted laser pulses.

According to another embodiment, the laser control parameters comprise at least one of a pulse duration, a pulse interval, pulse power, and a pulse wavelength of the laser pulses. In this way, further means of controlling the properties of the laser pulses is achieved.

In accordance with a further embodiment, the target distance is a distance between a reference point associated with a location of the terawatt femtosecond pulsed laser and the target location.

Additionally or alternatively, in an embodiment, the system comprises mounting means for mounting the system onto a mobile platform. This is especially advantageous since the system becomes movable and preferably self-propelled.

In further embodiments, the plasma burst application system is a drone disruption system.

In an alternative or additional embodiment, the plasma burst application system is a radio frequency transmitter/receiver disruption system.

In an embodiment, the laser control parameters comprise at least one of pulse duration, a pulse interval, pulse power, and pulse wavelength of the laser pulses. With pulse wavelength may be indicated any laser 'wavelength' that has a certain wavelength band. Thus "wavelength" may be indicated with "wavelength band". The wavelength band may be spread into a narrow spectrum of wavelengths, e.g. with a dispersion grating for use with a spatial light modulator (SLM).

According to a second aspect, there is provided a mobile platform comprising a plasma burst application system according to the first aspect. It will be understood that any of the above identified embodiments of the plasma burst application system and the associated advantages are applicable to the mobile platform.

In accordance with a third aspect, there is provided a method for applying a plasma burst to a target object at a target location using a terawatt femtosecond pulsed laser in a system according to any one of the preceding claims, the method comprising:

determining a target distance between the terawatt femtosecond pulsed laser and the target location;

setting one or more laser control parameters of the terawatt femtosecond pulsed laser according to the obtained target distance such that, when a laser pulse is emitted by the terawatt femtosecond pulsed laser, the laser pulse collapses at a selected laser pulse propagating distance based on the obtained target distance, and controlling the emission of at least one laser pulse towards the target location such that the laser beam collapses at substantially the selected laser pulse propagation distance in order to apply the plasma burst at the target location.

Preferably, the method comprises setting the one or more laser control parameters of the terawatt femtosecond pulsed laser according to the obtained target distance such that, when a laser pulse is emitted by the terawatt femtosecond pulsed laser, the laser pulse collapses at a laser pulse propagating distance substantially equal to the obtained target distance, and controlling the emission of at least one laser pulse towards the target location such that the laser beam collapses at substantially the target location in order to apply the plasma burst at the target location.

It will be understood that any of the above identified embodiments of the plasma burst application system according to the first aspect and mobile platform of the second aspect and the associated advantages are applicable to the present method and vice versa.

According to a fourth aspect, there is provided the use of a terawatt femtosecond pulsed laser for disrupting an airborne electronic device such as a drone.

Preferably, the use of a terawatt femtosecond pulsed laser comprises directing a laser pulse from the terawatt femtosecond pulsed laser towards the airborne electronic device such that the laser pulse collapses substantially at the electronic device.

It will be understood that any of the above identified aspects and embodiments and the respective associated advantages are applicable to the present aspect and vice versa.

According to a fifth aspect, there is provided the use of a terawatt femtosecond pulsed laser for disrupting radio frequency transmitters and/or receivers.

It will be understood that any of the above identified aspects and embodiments and the respective associated advantages are applicable to the present aspect and vice versa.

Regarding the term "plasma" used throughout in the present disclosure, with plasma at least is meant a composition wherein there is at least partial charge separation such that ions and electrons are present and an electric field or fields are present at least locally. The definition or description of what a plasma is as provided by Chen, Francis F., in Introduction to Plasma Physics and controlled fusion, Springer International Publishing, 1984, pp. 2-3, section 1.1, ISBN 9781475755954, is incorporated herein by reference.

The accompanying drawings are used to illustrate presently preferred non-limiting exemplary embodiments of systems, devices and methods of the present disclosure. The above and other advantages of the features and objects of the disclosure will become more apparent and the aspects and embodiments will be better understood from the following detailed description when read in conjunction with the accompanying drawings, in which.

Figure 1:
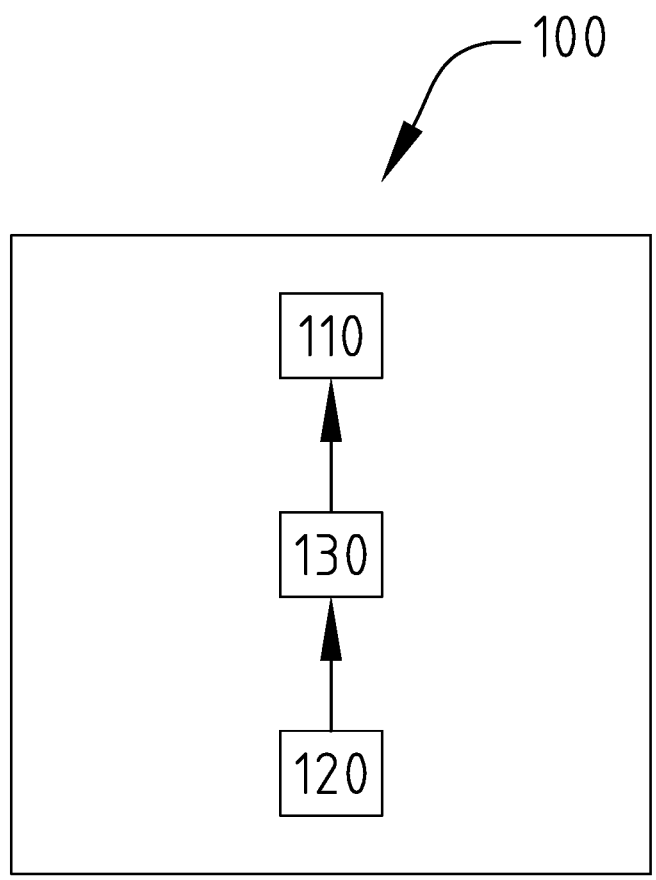
FIG. 1 is a schematic diagram of an embodiment of the plasma burst application system of the present patent disclosure.

Referring to FIG. 1, a plasma burst application system 100 for applying a plasma burst to a target object at a target location is shown. The system 100 comprises a terawatt femtosecond pulsed laser 110 for emitting femtosecond laser pulses, a distance obtaining unit 120 configured to obtain a target distance to the target location, and one or more controllers 130. The one or more controllers 130 are configured to receive the obtained target distance; set one or more laser control parameters of the terawatt femtosecond pulsed laser according to the obtained target distance such that, when a laser pulse is emitted by the terawatt femtosecond pulsed laser, the laser pulse collapses at a selected laser pulse propagation distance based on the obtained target distance, and control the emission of at least one laser pulse towards the target location such that the laser beam collapses at substantially the selected laser pulse propagation distance in order to apply the plasma burst at the target location.

Possible physical explanations and possible effects associated with the femtosecond laser pulses are described in the following sections.

Laser Filamentation

Here the physical processes of laser filamentation are elaborated.

Optical Kerr Effect

In linear optics (see e.g. SCHUBERT, Elise, *Laser filaments interactions with clouds and electric fields*, Thése de doctorat:Univ. Genéve, 2017, no. Sc. 5053, DOI: 10.13097/ archive-ouverte/unige:92961, the content of which are incorporated herein by reference in its entirety), when light propagates through an isotropic medium such as air, the instantaneous polarization P is directly proportional to the light electric field E:

$$P = \varepsilon_0 \chi^{(1)} E$$

where $\chi^{(1)}$ is the first order susceptibility of the propagation medium and $\varepsilon_0$ is the permittivity of vacuum. The resulting linear refractive index $n_0$ of the medium is $$n_0 = \sqrt{1+\chi^{(1)}}$$

The intensity of the light I can be defined as:

$$I = \frac{1}{2}\varepsilon_0 c \langle |E|^2 \rangle$$

When the intensity of the light is high, this equation may no longer hold. This equation can be generalized expressing the polarization as a power series $$P = \varepsilon_0 \chi^{(1)} E + \varepsilon_0 \chi^{(2)} E^2 + \varepsilon_0 \chi^{(3)} E^3 + \ldots$$

In media such as gasses, even terms vanish and the third order nonlinear polarization can be written as:

$$P = \varepsilon_0 \chi^{(1)} E + \varepsilon_0 \chi^{(3)} E^3$$

And therefore the nonlinear refractive index n can be written as:

$$n = \sqrt{1 + \chi^{(1)} + \chi^{(3)} \langle |E|^2 \rangle} \approx n_0 + n_2 I \quad \text{(1)}$$

Therefore, the effect of a strong optical field is to locally modulate the refractive index of the medium by superimposing on the constant linear term $n_0$ an intensity-dependent term $n_2 \times I$. This is called the optical Kerr effect and the nonlinear refractive index $n_2$ can be written as $$n_2 = \frac{3\chi^{(3)}}{4 n_0^2 \varepsilon_0 c}$$

The change in refractive index, $\Delta n$, is usually positive as the third order susceptibility is positive in most media. Therefore, the phase velocity of light is reduced when the light intensity is increased. For example, if a laser beam transverse profile is assumed to be Gaussian, $\Delta n$ will also be Gaussian, reaching its maximum at the center of the beam. The resulting wavefront will therefore bend as if propagating through a focusing optical lens, hence the reference to Kerr-lens effect or self-focusing to describe this phenomenon.

The self-trapping of light, or filamentation, occurs when the self-focusing is stronger than diffraction effects. This threshold defines the critical power $P_{cr}$ of the laser beam above which a filament can form:

$$P_{cr} = \frac{(3.72 \lambda_0^2)}{8 \pi n_0 n_2}$$

When $P_{cr}$ is reached, the beam self-focuses. The intensity within the self-focused region increases and nonlinear effects take place. $\lambda_0$ is the laser central wavelength.

Laser filamentation stems from the interplay of self-focusing by Kerr effect and plasma defocusing by photo-ionization and it leads to refocusing cycles that maintain the filament diameter approximately constant over a distance longer than several Rayleigh lengths, up to tens of meters and above.

Photo-ionization is the extraction of an electron from a molecule or an atom by one or many photons. When the light self-focuses, the intensity increases to a few tens of terawatts per square centimeter and with it the probability of multi-photon ionization.

The plasma of electrons formed by photo-ionization has a negative contribution to the refractive index:

$$n \approx n_0 - \frac{N_e}{2 N_{cr}} \Rightarrow \Delta n_{plasma} = \frac{-N_e}{2 N_{cr}}$$

wherein $N_{cr} = \epsilon_0 m_e \omega^2 / e^2$, $N_{cr}$ being the critical plasma density value above which the plasma becomes opaque, wherein $N_e$ is the free electron density, and $m_e$ and e being the electron mass and charge and $\omega_0$ the laser frequency. The negative refractive index variation therefore counterbalances the Kerr lens effect.

Figure 4:
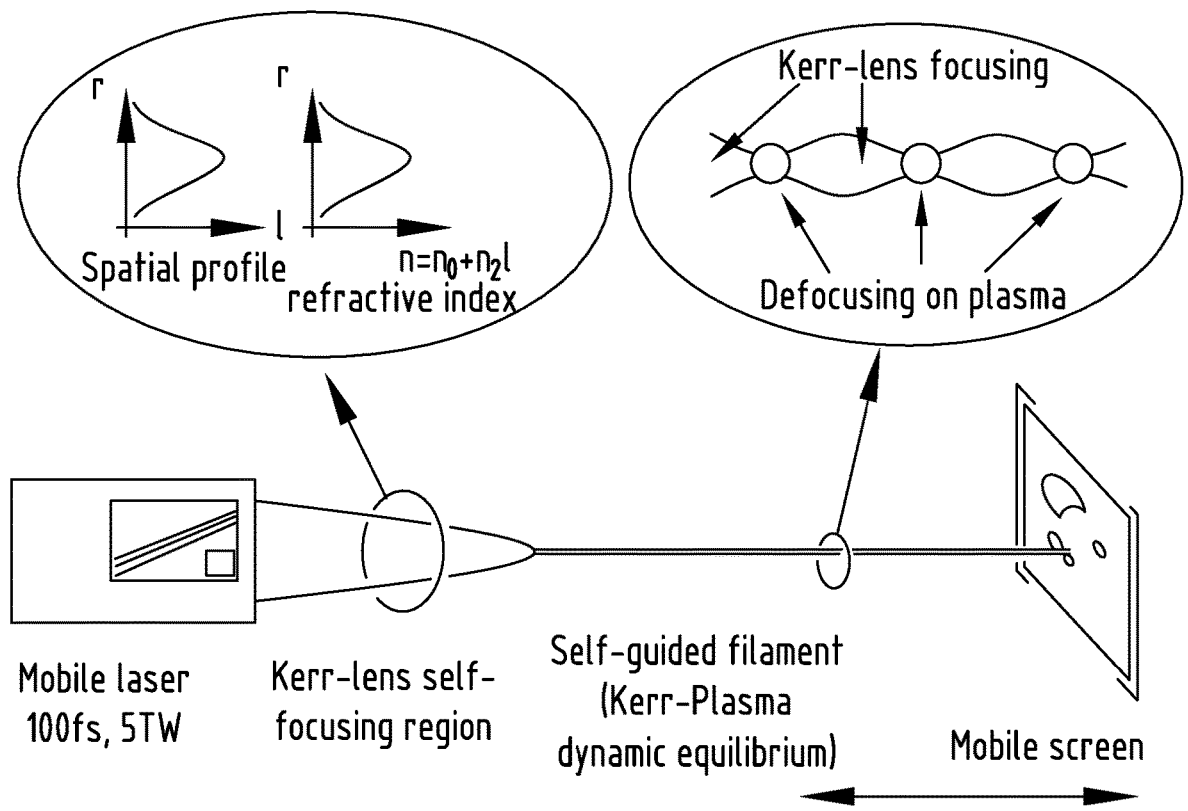
FIG. 4 is a schematic drawing showing the propagation of a femtosecond laser pulse.

A graphical representation of at least a part of the above section relating to the Kerr effect is shown in FIG. 4.

Range Control

Filamentation and Ionization Range

Here the possible parameters to control filamentation and ionization range of the femtosecond laser pulses are elaborated:

Considering a Gaussian laser beam propagating in air, we obtain the focusing distance:

$$z_m = -(g \cdot b_0 + \sqrt{g^2 \cdot b_m^2 - 2\alpha_1})/(g^2 + 2\alpha_1 b_0^2) \quad \text{Eq. 1}$$

wherein $z_m$ is focusing distance, g (=tan $\theta_0$) is the divergence of the beam, $\theta_0$ is the initial divergence angle, $b_0$ is initial beam size, $b_m$ is the focal spot size, $\alpha_1 = 1 - (P_0/P_N)$, $P_0$ is the laser power and $P_N$ is the critical power for self-focusing. The space is normalized by $\lambda_0$, where $\lambda_0$ is the laser central wavelength.

A detailed description of this model can be found for instance in Yu et al., Physics of Plasmas 11, 5360 (2004); https://doi.org/10.1063/1.1803841, the content of which is incorporated herein by reference in its entirety. Further reference is made to Zhang et al., OPTICS EXPRESS 10424, 12 Dec. 2005/Vol. 13, No. 25, the content of which is incorporated herein by reference in its entirety.

It can be seen from the above equation that $z_m$ increases rapidly with the $b_0$. That is, an intense laser pulse with $b_0$ at centimeter level can propagate in air for over thousands of meters before it is focused to the multiphoton ionization (MPI) threshold intensity.

The inventor of the present patent disclosure had the insight that Eq. 1 can be used to control the desired focusing location. Since the focusing distance $z_m$ is sensitive to the initial divergence angle $u_0$, which can be optically adjusted with great accuracy, such that it is possible to control the range of the desired focusing distance.

The propagation of high-power short-pulse laser beams over considerable distances in air is studied and observed experimentally. Filament propagation over distances in excess of 200 m has been reported. See e.g. Fontaine et al., Physics of Plasmas 6, 1615 (1999); doi: 10.1063/1.873715, the content of which is incorporated herein by reference in its entirety.

In summary, the above analytical model provides basis for control of the filamentation range in the plasma burst application system by setting the divergence, beam diameter, power, pulse length, pulse shape and wavelength.

The power of the laser beam eventually reduces to the Kerr threshold $P_N$. That is, the sudden onset of multiphoton ionization produces a burst of electrons at the focus. After that the beam diverges, since the Kerr effect is no longer operating/present.

The propagation continues as filament(s) until the beam power falls below the required $P_N$ and the filament(s) collapse, producing a plasma burst of ionized electrons and (white) light. This plasma burst placed accurately near the target object is one of the mechanisms for disrupting the target device, for example through electronic upset or damage due to electromagnetic fields and the conductive ionization.

The laser light is either absorbed in producing the plasma or scattered in a wide cone, so that there is no hazard of the closely collimated laser light propagating beyond the desired range, allowing for a high level of safety when operating the systems and methods of the present patent disclosure.

Multifilament

The above description concerns single laser pulses, but the results are also applicable to the case of the original beam/pulse breaking up into closely propagating parallel filaments.

It is common for the initial laser filament to separate into multiple channels, referred to as multiple filamentation (MF). Therefore, additional optical components may be integrated to further influence the beam behavior. Examples include a diaphragm mask to reshape the initial beam profile and/or controlled phase aberrations in the input beam. Such methods/additions to the system increase filamentation range.

Electromagnetic Pulse

In this section the efficacy of the electromagnetic pulse against electronic devices is shown.

EMP Effect

EMP effects are present both alongside the propagating Terawatt pulse, and at the plasma burst created by the beam collapse. EMP effects are exploited to disrupt electronic devices in either case, although the EM field along the beam path may only be strong enough within a few millimeters of the beam. The accuracy required for such fine control of beam pointing over a range of a several hundred meters is well within the capabilities of current pointing and tracking systems.

Such effects have been predicted, modeled and measured. For example, Cheng et al., in Phys. Rev. Lett., December 2001, DOI: 10.1103/PhysRevLett.87.213001, the content of which are included herein in its entirety, use a 20 TW beam with 10 femtosecond pulse length to calculate the radiated electric field strength from a filament of approximately 2 (kV/m).

Generally field strengths above 200 (V/m) are sufficient to disrupt functioning of electronic systems. The strength of the EM field is thus larger than the electric field potential necessary to disrupt electronic systems, circuits, and/or components.

The terawatt pulse propagation creates a small EM field travelling with the pulse. The strength of this field has been both modeled and confirmed with experiment [Penano 2004]. It is shown that an EMP of 10 kW/cm^2 is achievable, near to the beam around 1 mm Assuming the worst case of isotropic emission, this EM pulse will still create an effective field strength of several hundred (V/m) within a few centimeters of the beam. Therefore an effective EMP can be used to disturb electronic devices near the beam.

It is known to be possible to increase the amount of EM energy emitted from the Terawatt pulse. It is possible to reach field strength of 300 (kV/m).

As the Terawatt pulse propagates it loses energy until the intensity no longer creates the filamentation effect, at which point the beam collapses, ionizing the air and creating a burst of plasma. Intense (white) light, heat and electromagnetic emissions occur at the burst.

Figure 5:
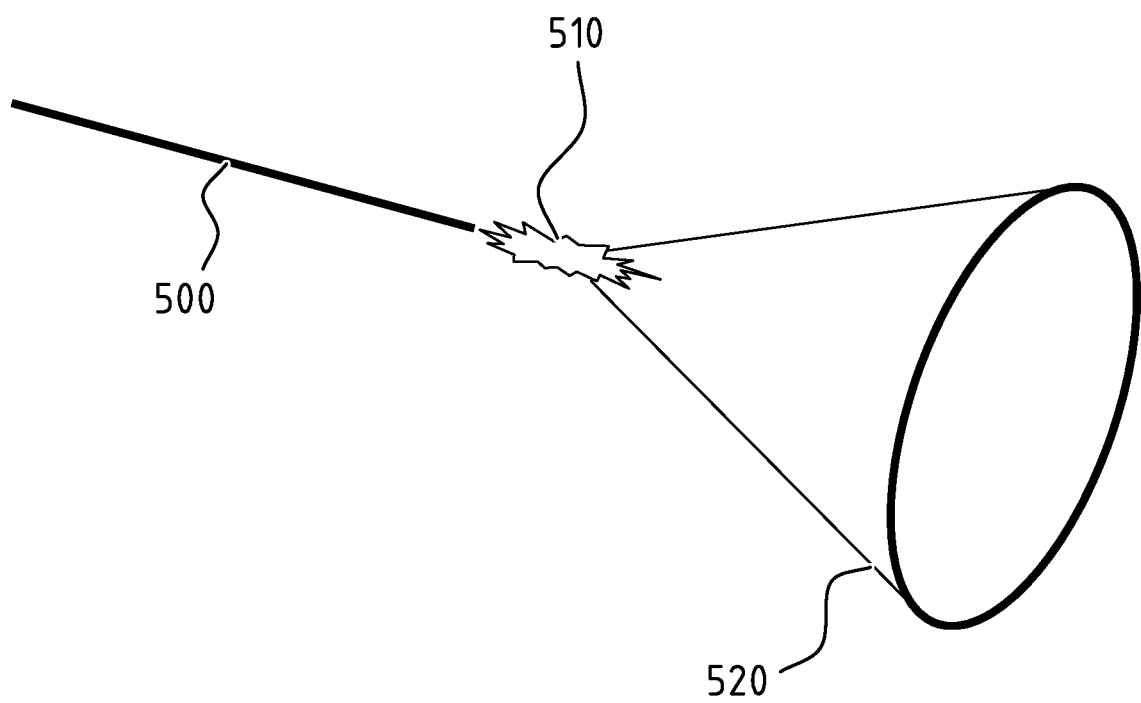
FIG. 5 is a schematic drawing of a cone shape of a plasma burst RF (terahertz) emission caused by the collapse of a femtosecond laser pulse.

Although the small EM field of the propagating Terawatt laser pulse can be effective, the EMP emission that occurs when the filaments collapse and create a plasma burst can be even more effective. This phenomenon has been used in experiments to create a burst of radio frequency waves at the termination of the beam. The terahertz waves tend to propagate forward in a cone from the point of collapse, as can be seen in FIG. 5. This figure shows a laser beam 500 (comprised of femtosecond laser pulses), which collapses with a burst 510. Electromagnetic radiation, in particular radiofrequency, RF, radiation, is emitted with a cone shape 520.

The EM energy of interest is at least partially in the terahertz frequency range (not to be confused with the terawatt energy of the laser pulse). The effects of RF emissions and their use against electronic devices occur in the terahertz range, but can occur at lower frequencies as well. In principle, all frequencies of the EM burst can be used.

Beam Collapse Plasma Burst

In this section the plasma burst THz emission is shown in detail.

In laboratory studies, THz emissions are used for various purposes. There are analyses and experimental results that indicate THz EMP can be generated under controlled conditions. Several laser parameters, such as pulsed shape and pulse length, are shown to have predictable effect on the THz emission.

The efficiency of creating THz energy can also be enhanced by orders of magnitude by selecting the laser wavelength.

In addition to the electromagnetic emissions used to disrupt the target device, the present patent disclosure also utilizes other effects of the plasma burst, such as the creation of conductive ionized air, light, heat, and acoustic shock waves in the air. The acoustic shock can be useful against small airborne targets that are sensitive to aerodynamic or kinetic upsets.

Laser Beam Shaping

Figure 6:
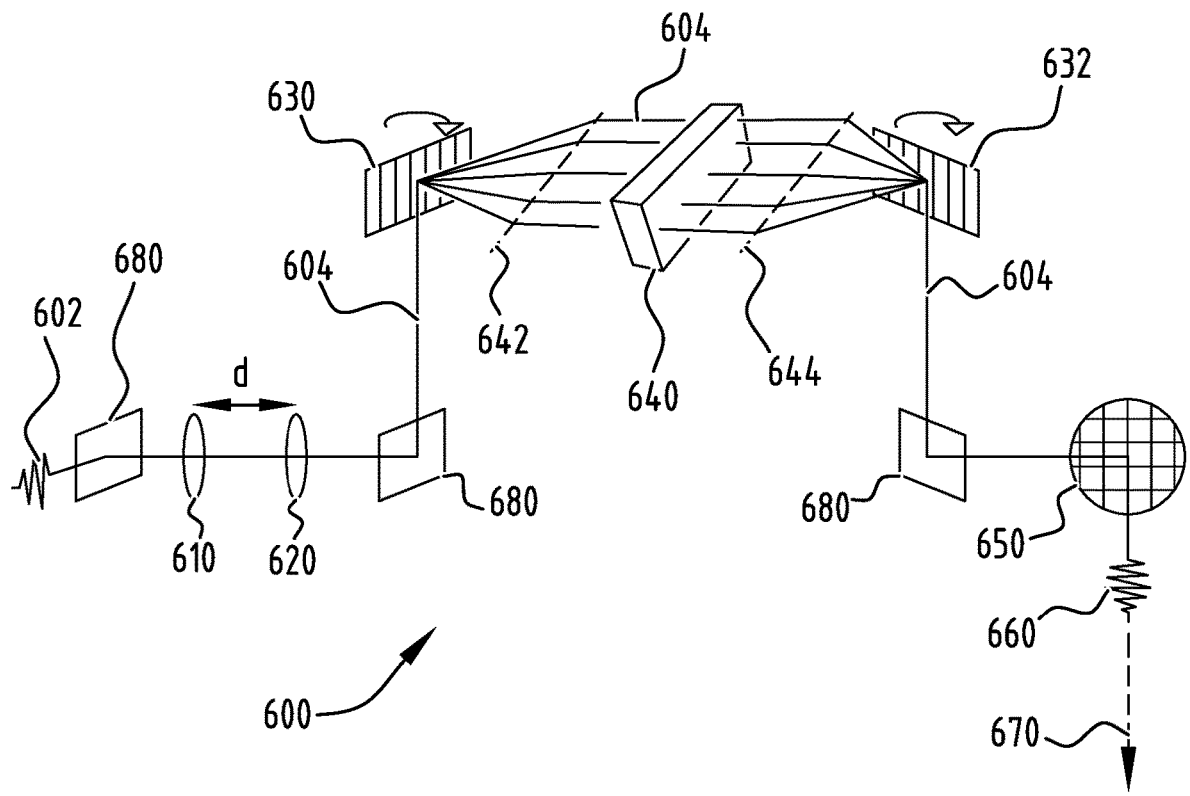
FIG. 6 is a schematic drawing of an embodiment of beam control of a femtosecond pulsed laser according to the present patent disclosure.

Coming now to the embodiment of beam control of the femtosecond pulsed laser FIG. 6, therein are shown several ways to control the characteristics of the laser pulse, some independently or all in combination can be used to tailor the laser pulse shape.

As was mentioned above in Eq. 1, g the divergence of the beam, $b_0$ the initial beam size, and $b_m$ the focal spot size, can be used to control the focusing distance.

Figure 2:
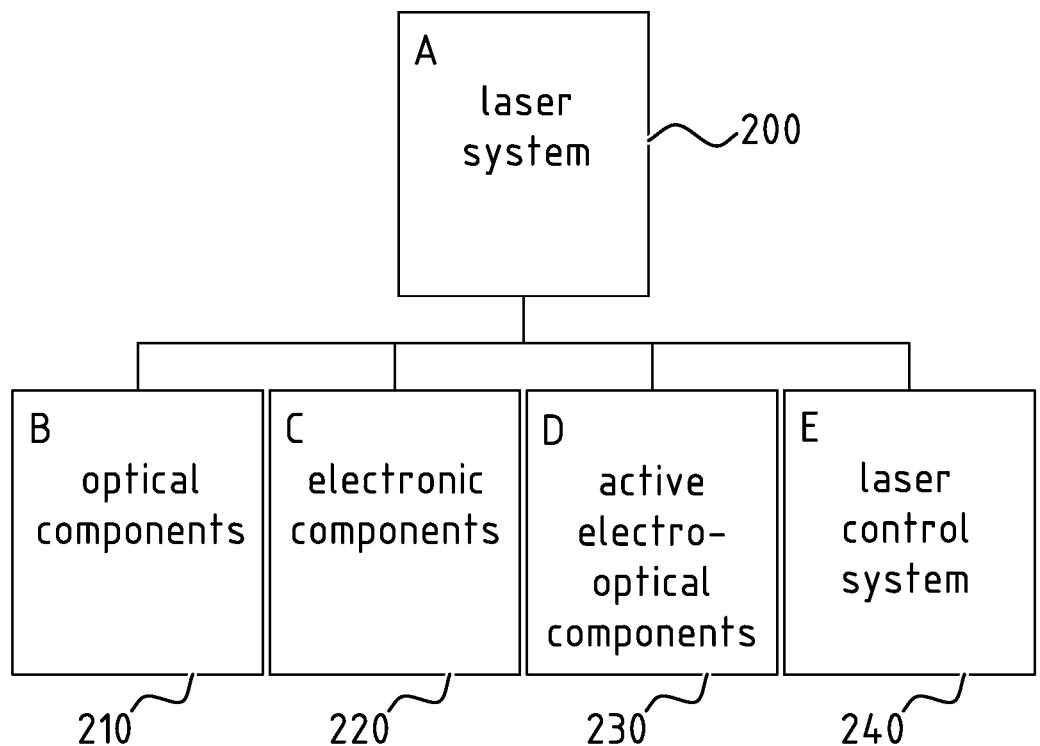
FIG. 2 is a schematic diagram of an embodiment of the plasma burst application system of the present patent disclosure.

As shown in FIG. 2, the laser system 200 may comprise optical components 210(B), electronic components 220(C), active electro-optical components 230(D) and a laser control system 240(E).

A laser pulse conditioning system 600 is shown in FIG. 6. The conditioning system 600 may comprise one or more of, or one or more parts of, the optical components 210(B), the electronic components 220(C), the active electro-optical components 230(D) and the laser control system 240(E). The conditioning system 600 and laser system 200 may be comprised in the system 100 of FIG. 1, the system 300 of FIG. 3, or any of the other systems described herein.

The conditioning system 600 comprises a pair of focusing lens 610 and defocusing lens 620. The filamentation of the input fs laser pulse 602 can be controlled by the pair of focusing 610/defocusing 620 lenses acting as a telescope. Adjusting the distance d between the two lenses may be used to adjust the filamentation distance, or in other words, the selected laser pulse propagation distance.

The conditioning system 600 may alternatively or additionally comprise a first prism grating 630 and a second prism grating 632. The femtosecond pulse 602 can thus be tailored by using the set of prism gratings 630 and 632 to spread the spectral content of the pulse 602. Electronic control of the grating angles can be implemented The conditioning system 600 may alternatively or additionally comprise a spatial light modulator (SLM) 640. The SLM 640 may be used to modify different wavelengths and for combining the spread spectrum once again into the tailored femtosecond pulse 660. Electronic control of the electronic SLM component 640 is preferably implemented. The conditioning system 600 may comprise various other optical elements for directing the laser beam/pulse from and to the various components. These optical elements may include redirecting mirrors 680 and/or lenses 642 and 644.

The femtosecond pulse can alternatively or additionally be tailored by using a deformable mirror 650 to alter the phase of different areas of the wavefront. The resulting phase profile can be optimized for the desired results in controlling multifilament behavior and filamentation range.

To summarize, using the conditioning system 600, there are several parameters that can be controlled, including:
 the separation (d) of the pair of focusing/defocusing lenses 610 and 620;
 the angle of the prism gratings 630 and 632,
 modifying different wavelengths and/or combining the spread spectrum by the SLM 640, and/or
 the phase profile by the deformable mirror 650.

It is furthermore possible to include the control of the input fs laser pulse 602 in terms of pulse duration, pulse interval, pulse power and wavelength.

All of these may be controlled by the one or more controllers to control the laser control system (FIG. 2).

Figure 3:
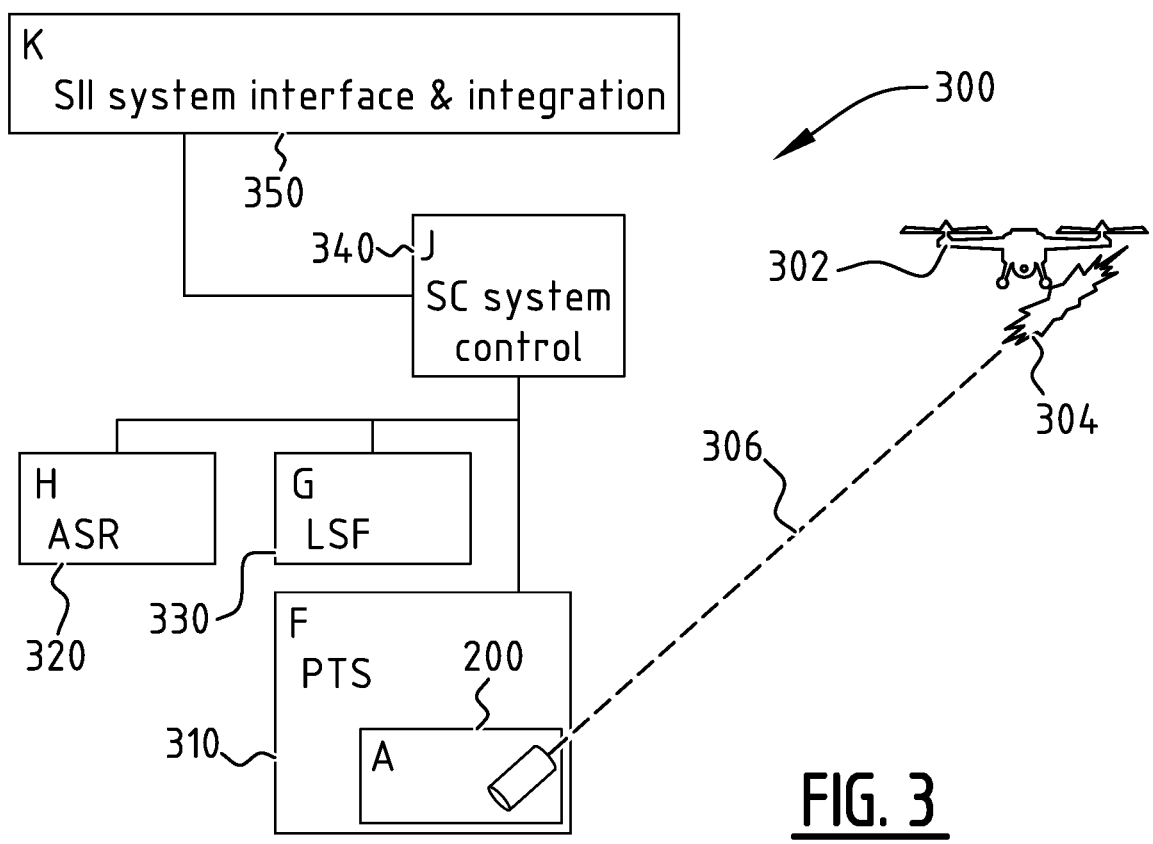
FIG. 3 is a schematic diagram of an embodiment of the plasma burst application system of the present patent disclosure.

As shown in FIG. 3 in the example of the plasma burst application system 300, in order to optimize the desired effects of the burst 304 on the target location/target object 302, the adjustments to the output pulses 306 may be modified by a laser sensing and feedback system 330 (G; LSF) through a System Control processor 340 (J; SC). The system 300 may comprise a pointing and tracking system (PTS) 310, used to control a laser system such as the laser system 200 in order to direct the beam to the target object 302. The system 300 may further comprise an area surveillance and ranging system (ASR) 320. The system 300 may further comprise a system interface and integration system 350, which may be an interface to a host system such as airfield security system or other application. One or more of these components and systems are described in further detail herein below.

The systems 100 and 300 may be referred to as "terawatt protection system" or TPS.

Figure 7:
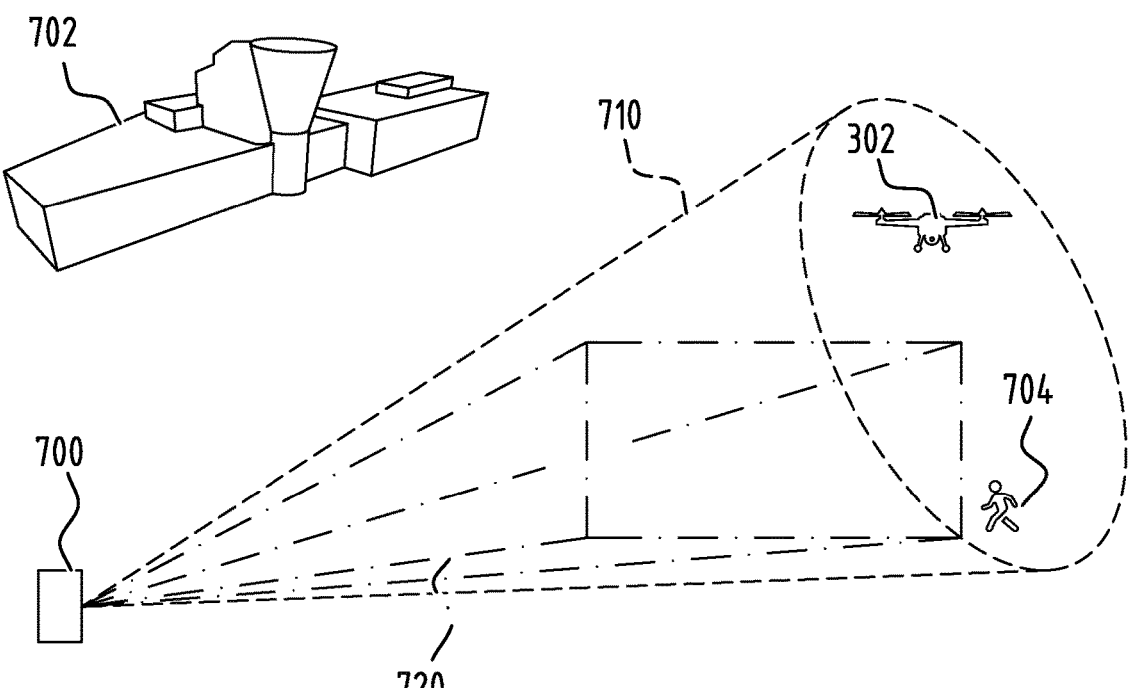
FIG. 7 is a schematic drawing of a system according to the present patent disclosure in the field wherein a laser hazard volume is shown.

In FIG. 7, a plasma burst application 700, such as the system 100 or 300, is positioned at an airport 702. As indicated in FIG. 7, the span of the area where the TPS observes objects is called the Field Of Regard (FOR) 710. The field of view (FOV) of the ASR 320, or sensor comprised by the ASR, combined with the angular range of the PTS 310, define the entire FOR 710. For many implementations it is common that the FOR 710 and the FOV are the same, but close integration and control of the PTS 310 can allow designs where the FOV is scanned or stepped through the FOR 710 to provide the required coverage.

The convention for describing eye safety refers to the Nominal Hazard Zone, an area where the laser energy presents a risk for eye injury. Now with the present systems, where the laser range is limited and controlled, a Laser Hazard Volume (LHV) 720 can be defined. The FOR 710 and LHV 720 are shown in FIG. 7. The LHV can also be referred to as the Limited Nominal Hazard Zone (LNHZ).

The ASR 320 is configured to detect objects of interest in the three dimensional volume of the FOR 710. These objects, e.g. 302 and 704, may be either desired targets 302 (e.g. drones) or protected objects 704 (e.g. personnel and/or authorized vehicles or aircraft). The location and identity of the objects 302 and 704 are preferably measured in three dimensions and transmitted to the SC 340, which is an embodiment of one or more of the one or more controllers. The SC 340 is configured to determine if the TPS may output the fs laser pulses when no hazard is created for protected objects 704.

The ASR may comprise one or more sensors that can be implemented by a laser radar or range gated viewing camera. Other implementations of the sensor are possible, such as an imaging camera operating in different spectral bands (e.g. video, SWIR, LWIR) combined with a ranging sensor such as a laser range finder or high resolution radar.

The SC 340 may be configured to obtain the range to the target such that the SC 340 is enabled to control the laser system 200 to set the beam/pulse collapse at the desired range, and/or to ensure that the beam/pulse collapse does not occur outside the LHV 720.

It is possible that the TPS maximum range can extend for several or many hundreds of meters, therefore a situation may occur (although unlikely) that the ASR 320 may detect both target drones 302 and aircraft within the FOR 710. The ASR 320 is therefore preferably configured to identify whether a detected object is a drone, person, vehicle, or piloted aircraft. Image (signal) processing techniques to discriminate between drones, persons, and piloted aircraft are in general well established and will be familiar to a person skilled in the art. In the present systems, however, the target discrimination is simplified because the target range is available from the ASR 320 and therefore the physical size of the target can be used in the identifying whether a detected object is a drone, person, vehicle, or piloted aircraft.

The ASR 320 is preferably configured to perform the identifying in real time to ensure that the fs laser pulse position in azimuth, elevation and range does not present an eye hazard.

The ASR 320 is preferably additionally or alternatively configured to perform a real time evaluation of target effects (effectiveness assessment).

While the above describes the function and operation of the ASR as part of the TPS, the operation of the TPS does not necessarily require that the ASR is included in the TPS assembly. If the TPS is installed at a location that has other sensor systems that provide the same function, the SC can still control the range of the fs laser pulse to the required limit, while data from such an external installation indicates one or more locations of respective objects in the FOR and LHV.

Figure 8:
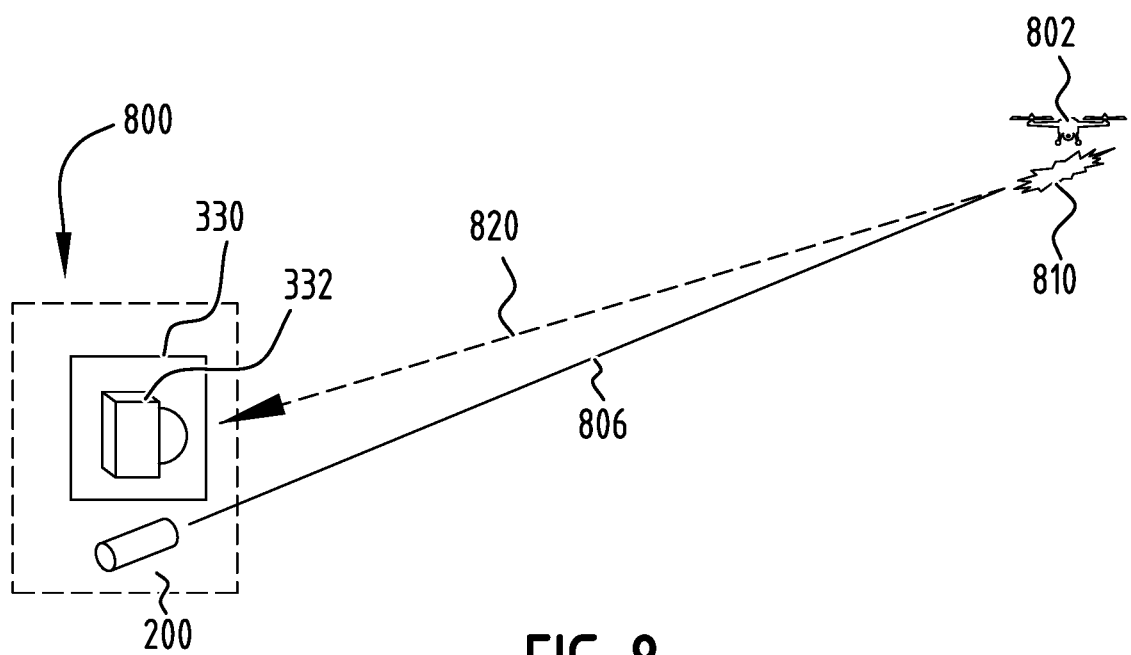
FIG. 8 is a schematic drawing of a system according to the present patent disclosure wherein a laser pulse collapse sensor is used.

The TPS may optionally comprise the laser sensing and feedback system (LSF) 330, as shown for example in the system 800 of FIG. 8. The laser system 200 emits pulses 806 towards the target object 802. The LSF 330 comprises a sensor 332 is configured to detect light or other radiation emitted due to the beam/pulse collapse burst 810 and travelling along path 820. In this way, data on the actual range of the burst 810 is provided, allowing a comparison with the required range, viz. the range of the target object 802.

Preferably, the sensor 332 is configured to detect the optical emissions of the plasma burst 810, or to sense the RF (or terahertz) emission caused by the burst 810. Additionally or alternatively, the LSF 330 may comprise sensor systems such as a LiDAR or a range gated viewing sensor.

Preferably, the system 800 is configured to use real time feedback to make adjustments to the laser system 200 in order to correct for the difference between the range of target object 802 and the actual distance of the burst 810. These differences may be due to local atmospheric conditions or other factors, and can thus be corrected for. This sensor 332 can be a wide field-of-view sensor that detects the plasma burst and measures the range by the time of flight interval.

The LSF 330 is preferably configured to calibrate its timing with the laser in order to increase the accuracy of the time of flight calculations. The LSF 330 may also be configured to provide other diagnostic information about the fs laser collapse.

The LSF 330 may improve the safety and accuracy of the TPS, but the LSF 330 is not necessary for safe TPS operation.

One implementation of the LHV is to define a static region where eye hazard protection is required. In one implementation, the LHV is defined during installation and set up of the TPS, taking into account the local environment.

Figure 9:
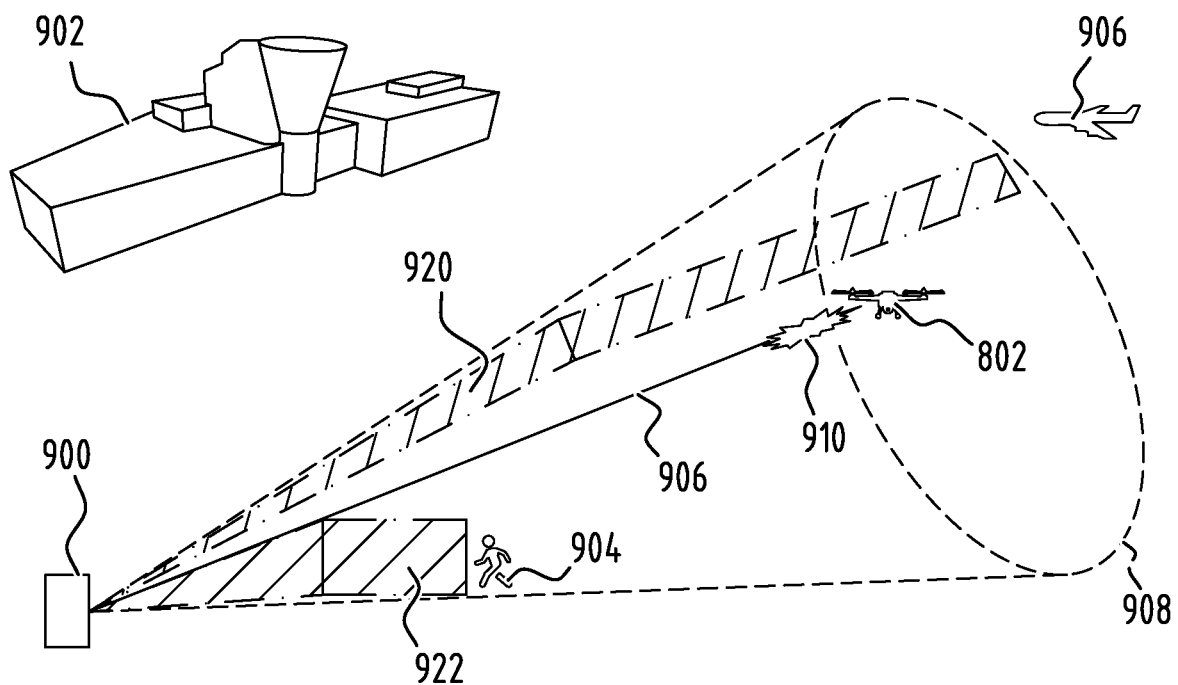
FIG. 9 is a schematic drawing of a system according to the present patent disclosure in the field wherein a laser hazard volume is shown.

Another variation of the way the LHV is handled is to adapt the LHV dynamically based on sensor input, especially when the ASR 320 is configured to detect and discriminate objects in real time. As shown in FIG. 9, the ASR 320 may be configured to define the LHV(s) enclosing or pointing towards the object to be protected, e.g. objects 904 and 906, such that the LHV(s), e.g. LHV 920 and 922, is/are established around or in the direction of each protected object (e.g. resp. 904 and 906) and the TPS can still allow the fs laser to be emitted towards the target object 802 in the FOR 908.

Figure 10:
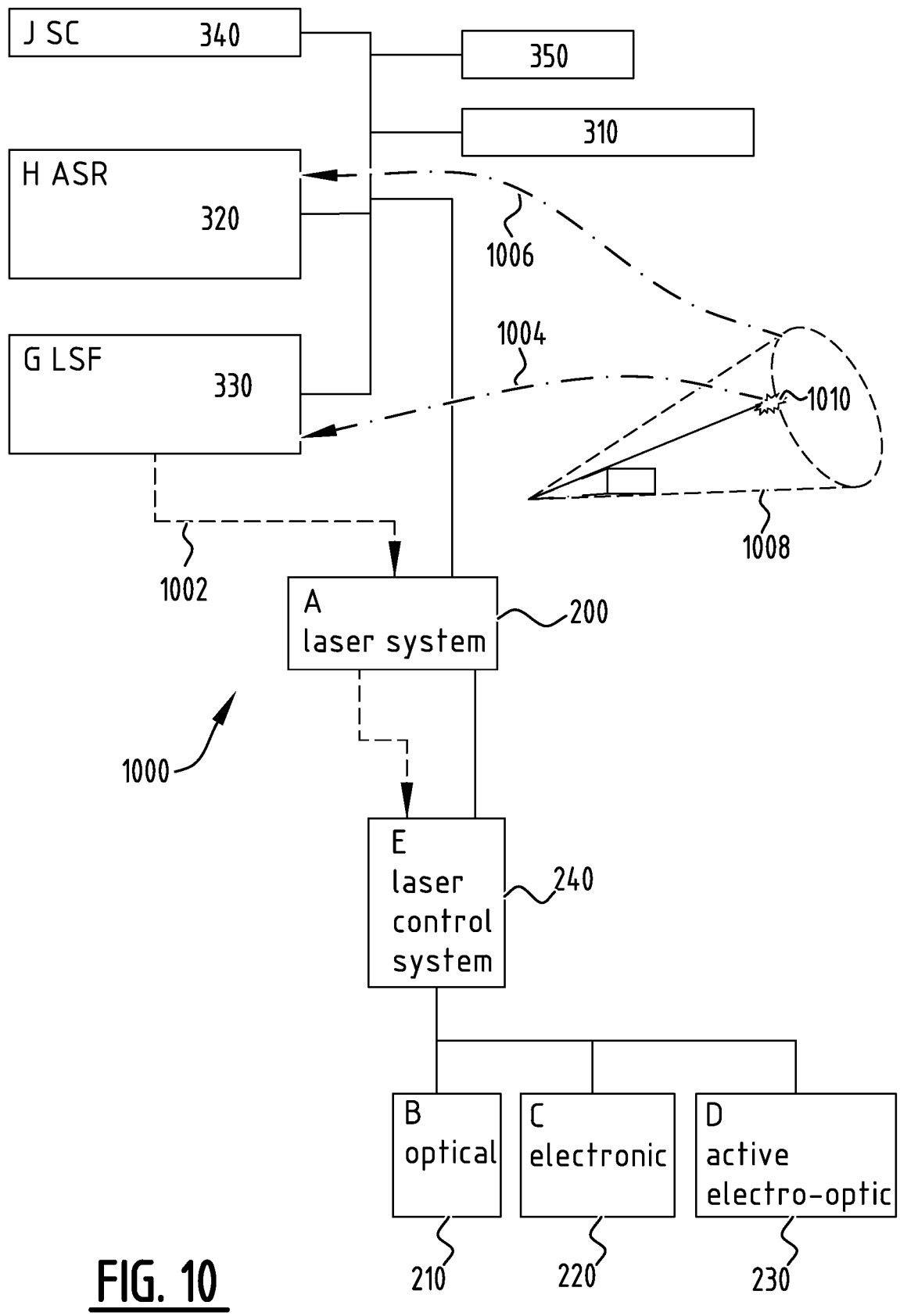
FIG. 10 is a schematic diagram of an embodiment of the plasma burst application system of the present patent disclosure.

A further embodiment of the TPS is shown in FIG. 10 as system 1000. In the diagram of FIG. 10, communication and/or control connections are shown with solid lines, LSF data communications that may require consideration is shown in dashed lines, and signals sensed are shown with dash-dot-dashed lines. In particular, the detection of objects within the FOR 1008 is shown with line 1006. The detection of the plasma burst emissions of the burst 1010 with line 1004, and the laser diagnostics communication with line 1002.

Figure 11:
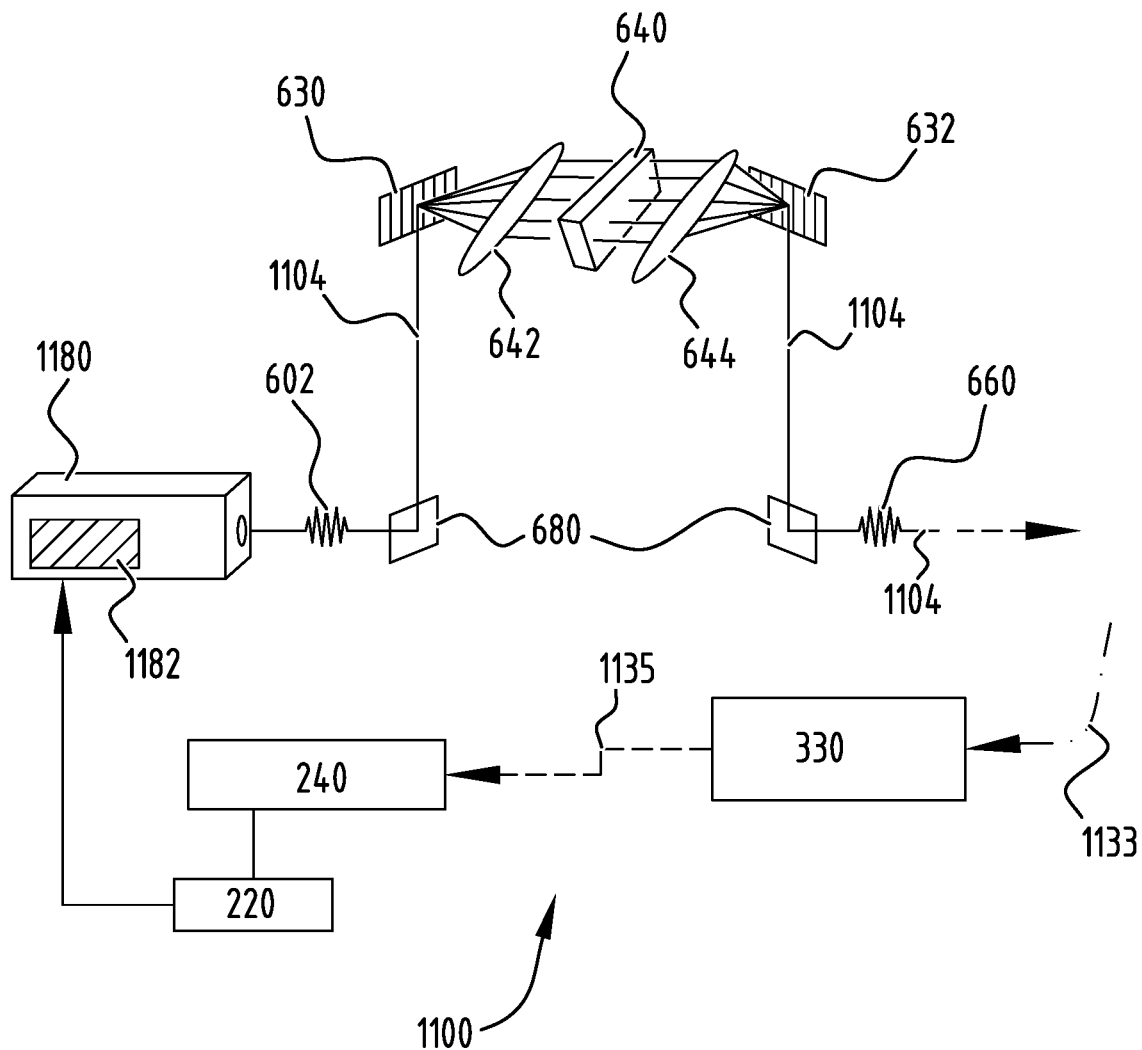
FIG. 11 is a schematic drawing of an embodiment of beam control of a femtosecond pulsed laser according to the present patent disclosure.
Figure 12:
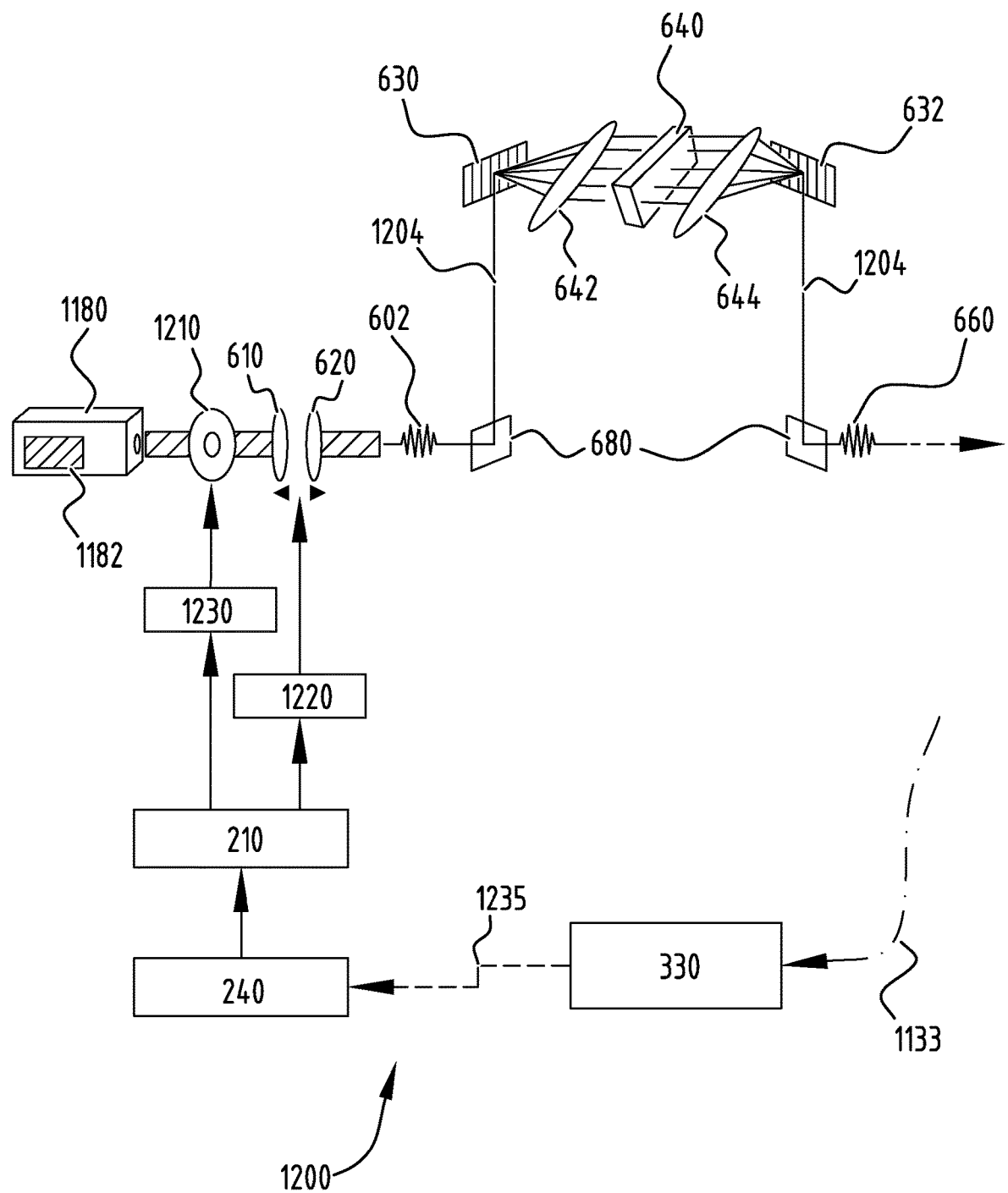
FIG. 12 is a schematic drawing of another embodiment of beam control of a femtosecond pulsed laser according to the present patent disclosure.
Figure 13:
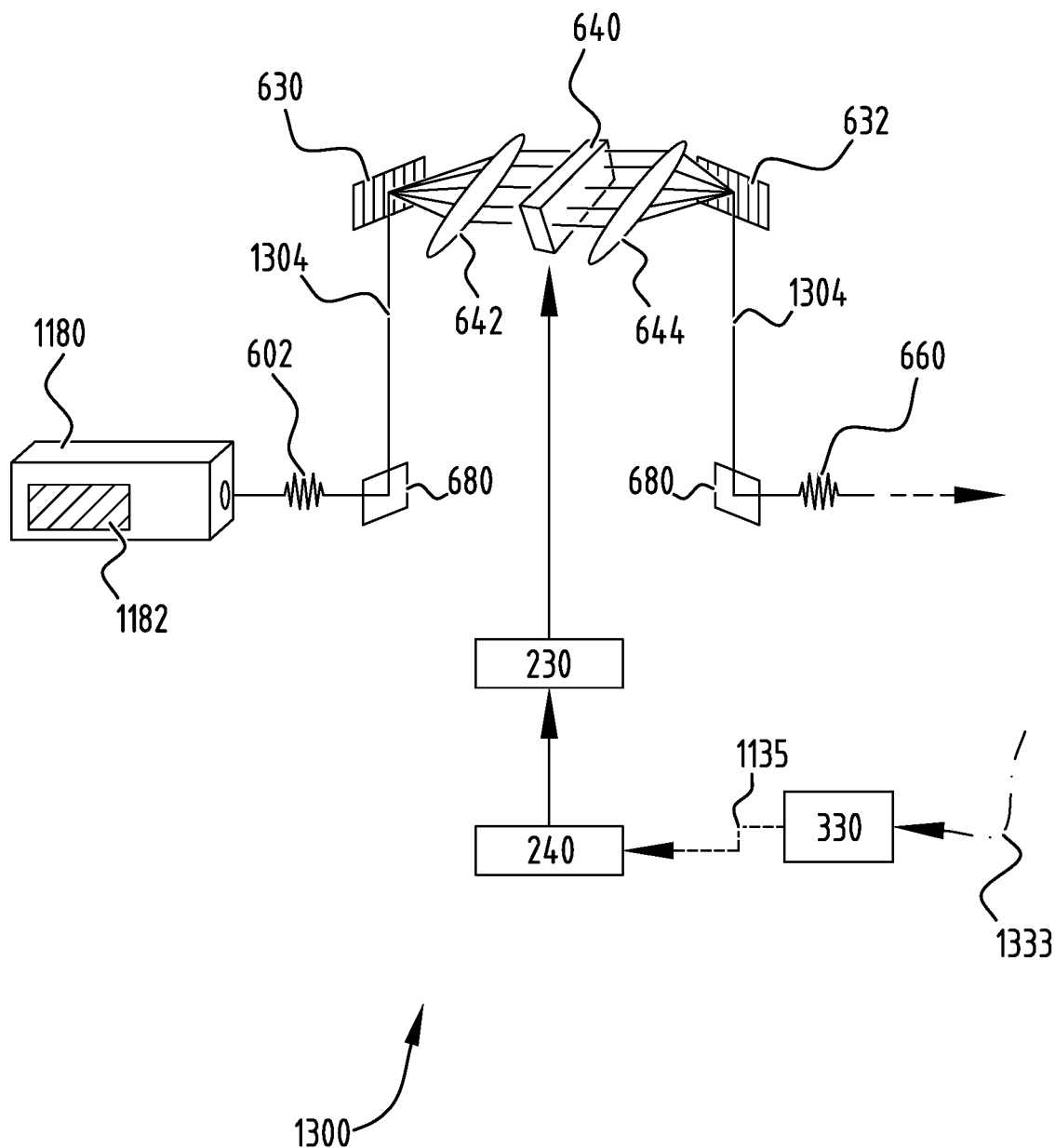
FIG. 13 is a schematic drawing of another embodiment of beam control of a femtosecond pulsed laser according to the present patent disclosure.

Additional embodiments of laser pulse conditioning systems are shown in FIGS. 11-13, wherein respectively pulse power, beam divergence & diameter, and pulse shape are used to control the range of the plasma burst.

FIG. 11 shows a laser pulse conditioning system 1100 according to the second embodiment. The laser diagnostic sensing data is received by the laser control system 240 from the laser sensing and feedback (LSF) system 330, as shown with arrow 1135. The system 1100 may alternatively or additionally also use other suitable data from other components of the TPS, such as the ASR 320 (not shown in FIG. 11)

FIG. 11 shows that the plasma burst range is detected by the LSF 330 through detecting the signal 1133. The associated data is passed to the laser control system 240, as denoted by the dashed arrow 1135. The laser control system 240 is arranged to output a control signal towards the laser pulse power circuit 220 which in turns controls the laser power 1182 of the laser source 1180. The laser power 1182 is controlled to provide the desired range of the pulse collapse and thus the plasma burst. This produces the laser pulse 602, which travels along optical path 1104. The other optical elements are denoted with the same labels as in FIG. 6 and have the same function as described for FIG. 6 above.

FIG. 12 shows the third embodiment of the laser pulse conditioning system 1200. FIG. 12 shows that the plasma burst range is detected by the LSF 330 through detecting the signal 1233. The associated data is passed to the laser control system 240 as denoted by the dashed arrow 1235. The laser control system 240 is arranged to output a control signal towards the optical element control 210 which in turn controls the aperture of the optical aperture 1210 via aperture controller 1230 and the lens distance between lenses 610 and 620 via the lens controller 1220. The beam diameter and divergence are controlled in order to adjust to the desired range of the plasma burst. The laser pulse 602 travels along optical path 1204. The other optical elements are denoted with the same labels as in FIGS. 6 and 11 and have the same or similar functions as described resp. for FIGS. 6 and 11 above.

FIG. 13 shows the fourth embodiment of the laser pulse conditioning system 1300. FIG. 13 shows that the plasma burst range is detected by the LSF 330 through detecting the signal 1333. The associated data is passed to the laser control system 240 as denoted by the dashed arrow 1335. The laser control system 240 is arranged to output a control signal towards the active electro-optical element controller 230 which in turn controls the SLM 640 and gratings 630 and 632 (in particular the resp. angles with respect to the optical path 1104 thereof) in order to adapt the laser pulse shape such that the range of the plasma burst is adapted. The femtosecond pulse 602 travelling along optical path 1104 is tailored by using the prism grating 630 to spread the spectral content of the pulse. Then, different wavelengths are modified using the SLM 640, whereafter the spread spectrum is combined once again with grating 632 into the tailored femtosecond pulse 660, also travelling along optical path 1304. The other optical elements are denoted with the same labels as in FIGS. 6 and 11 and have the same function as described resp. for FIGS. 6 and 11 above.

It will be understood that the various embodiments described can be combined to achieve desired effects. In particular, the embodiments of FIGS. 11-13 can be readily combined to provide for precise control of the collapse range of the femtosecond laser pulses to apply the burst at or near the target object.

The spectral pulse shaping components in the above described embodiments are shown schematically and are not necessarily intended to illustrate the complete assembly. It will be understood that there are various methods for spectral shaping, comprising using active electro-optic components such as CCD, liquid crystal SLM, acousto-optic modulator SLM, glass plate array SLM, etc.

The disclosure comprises the following clauses.

1. Plasma burst application system for applying a plasma burst to a target object at a target location, the system comprising:
    a terawatt femtosecond pulsed laser for emitting femtosecond laser pulses;
    a distance obtaining unit configured to obtain a target distance to the target location; and one or more controllers configured to:
receive the obtained target distance;
set one or more laser control parameters of the terawatt femtosecond pulsed laser according to the obtained target distance such that, when a laser pulse is emitted by the terawatt femtosecond pulsed laser, the laser pulse collapses at a selected laser pulse propagation distance based on the obtained target distance, and
control the emission of at least one femtosecond laser pulse towards the target location such that the laser beam collapses at substantially the selected laser pulse propagation distance in order to apply the plasma burst at the target location.

2. Plasma burst application system according to clause 1, comprising:
a target direction determining unit configured to determine a target direction towards the target location from the terawatt femtosecond pulsed laser; and
a laser pulse directioning unit configured to receive the determined target direction and to direct laser pulses emitted by the terawatt femtosecond pulsed laser towards the target location based on the determined target direction.

3. Plasma burst application system according to clause 2, wherein the laser pulse directioning system is configured to:
be in mechanical contact with the terawatt femtosecond pulsed laser and configured to move the terawatt femtosecond pulsed laser based on the determined target direction such that the laser pulses emitted by the terawatt femtosecond pulsed laser are directed towards the target location; and/or
direct the emitted laser pulses using a movable laser pulse redirecting device.

4. Plasma burst application system according to any one of the preceding clauses, comprising a tracking system comprising the distance obtaining unit and the target direction determining unit, wherein the tracking system is configured to:
detect one or more respective locations of one or more objects in a field of regard, FOR, of the plasma burst application system; and
determine whether a detected object is a target object or a protected object, the protected object being an object which is to be protected from laser pulses emitted by the plasma burst application system,
wherein the one or more controllers are configured to receive the respective locations of the protected objects and to determine whether a laser pulse can be emitted or not based on the received respective locations of the protected objects, the determined target direction and the obtained target distance.

5. Plasma burst application system according to clause 4, wherein the one or more controllers are configured to determine that a laser pulse can not be emitted when the respective locations of the protected objects are within a predetermined distance of a laser pulse path along which laser pulses emitted by the terawatt femtosecond laser travel towards the target location.

6. Plasma burst application system according to clause 4 or 5, wherein the tracking system comprises a light detection and ranging, LiDAR, device and/or a range gated viewing camera.

7. Plasma burst application system according to any one of the preceding clauses, wherein the laser controller is configured to
control a pulse repetition frequency of the terawatt femtosecond pulsed laser;
obtain a radio frequency or radio frequency band to be disrupted; and
control the pulse repetition frequency according to the determined radio frequency or radio frequency band thereby causing radio frequency transmitters and/or receivers operating with the obtained radio frequency or radio frequency band at the target location to be disrupted upon collapse of the laser pulse substantially at the target location.

8. Plasma burst application system according to any one of the preceding clauses, further comprising a laser pulse collapse sensor configured to obtain a collapse distance of laser pulses emitted by the terawatt femtosecond pulsed laser, wherein the one or more controllers are configured to:
receive the collapse distance;
determine a difference between the collapse distance and the obtained target distance;
when the determined difference between the collapse distance and the obtained target distance exceeds a first threshold value, adapt the one or more laser control parameters such that the difference between the collapse distance and the obtained target distance is reduced.

9. Plasma burst application system according to clause 8, in dependence of clause 5, wherein the predetermined distance is reduced if the determined difference between the collapse distance and the obtained target distance is smaller than a second threshold value.

10. Plasma burst application system according to clause 8 or 9, wherein the laser pulse collapse sensor is configured to detect the plasma bursts caused by collapse of the laser pulses, wherein the collapse distance is obtained based on respective time-of-flights of laser pulses and corresponding respective plasma bursts.

11. Plasma burst application system according to any one of the preceding clauses, wherein the terawatt femtosecond pulsed laser comprises a femtosecond laser pulse generator for generating the femtosecond laser pulses.

12. Plasma burst application system according to clause 11, wherein the terawatt femtosecond pulsed laser further comprises:
a defocusing lens for defocusing laser pulses emitted by the femtosecond laser pulse generator;
a focusing lens for focusing the defocused laser pulses; and
a distance adjuster for adjusting a distance between the defocusing lens and the focusing lens,
wherein the laser control parameters comprise a distance between the focusing lens and the defocusing lens.

13. Plasma burst application system according to clause 11 or 12, wherein the terawatt femtosecond pulsed laser further comprises:
a first optical element for separating a generated laser pulse into a plurality of spectral components;
a spatial light modulator positioned to receive the spectral components and configured to spatially modulate the spectral components; and
a second optical element for combining the modulated spectral components into a modulated laser pulse,
wherein the laser control parameters comprise spatial modulation parameters of the spatial light modulator.

14. Plasma burst application system according to clause 13, wherein the first optical element is a first grating and the second optical element is a second grating, wherein the one or more controllers are configured to adapt respective first and second angles of the first and second gratings, wherein the laser control parameters comprise the first and second angles of respectively the first and second gratings.

15. Plasma burst application system according to any one of clauses 11-14, wherein the terawatt femtosecond pulsed laser further comprises a deformable mirror configured to alter a phase profile of a wavefront of generated laser pulses.

16. Plasma burst application system according to any one of the preceding clauses, the laser control parameters comprising at least one of a pulse duration, a pulse interval, pulse power, and pulse wavelength of the laser pulses.

17. Plasma burst application system according to any one of the preceding clauses, wherein the target distance is a distance between a reference point associated with a location of the terawatt femtosecond pulsed laser and the target location.

18. Plasma burst application system according to any one of the preceding clauses, wherein the system comprises mounting means for mounting the system onto a mobile platform.

19. Plasma burst application system according to any one of clauses 1-18, wherein the plasma burst application system is a drone disruption system.

20. Plasma burst application system according to any one of clauses 1-18, wherein the plasma burst application system is a radio frequency transmitter/receiver disruption system.

21. Mobile platform comprising a plasma burst application system according to any one of clauses 1-20.

22. Method for applying a plasma burst to a target object at a target location using a terawatt femtosecond pulsed laser in a system according to any one of the preceding clauses, the method comprising:
  determining a target distance between the terawatt femtosecond pulsed laser and the target location;
  setting one or more laser control parameters of the terawatt femtosecond pulsed laser according to the obtained target distance such that, when a laser pulse is emitted by the terawatt femtosecond pulsed laser, the laser pulse collapses at a laser pulse propagating distance substantially equal to the obtained target distance, and
  controlling the emission of at least one femtosecond laser pulse towards the target location such that the laser beam collapses at substantially the target location in order to apply the plasma burst at the target location.

23. Use of a terawatt femtosecond pulsed laser for disrupting an airborne electronic device such as a drone.

24. Use of a terawatt femtosecond pulsed laser according to clause 23, comprising directing a laser pulse from the terawatt femtosecond pulsed laser towards the airborne electronic device such that the laser pulse collapses substantially at the electronic device.

25. Use of a terawatt femtosecond pulsed laser for disrupting radio frequency transmitters and/or receivers.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labelled as "units", "processors" or "modules", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "unit", "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Whilst the principles of the described methods and devices have been set out above in connection with specific embodiments, it is to be understood that this description is merely made by way of example and not as a limitation of the scope of protection which is determined by the appended claims.

The invention claimed is:

1. A plasma burst application system for applying a plasma burst to a target object at a target location, the system comprising:
  a terawatt femtosecond pulsed laser for emitting femtosecond laser pulses with associated filaments;
  a distance obtaining unit configured to obtain a target distance to the target location;
  one or more controllers configured to:
    receive the obtained target distance;
    set one or more laser control parameters of the terawatt femtosecond pulsed laser according to the obtained target distance such that, when a laser pulse is emitted by the terawatt femtosecond pulsed laser, the laser pulse filaments collapse at a selected laser pulse propagation distance based on the obtained target distance, and
    control the emission of at least one femtosecond laser pulse towards the target location such that the filaments of the at least one femtosecond laser pulse collapse at substantially the selected laser pulse propagation distance in order to apply the plasma burst at the target location; and
  a tracking system comprising the distance obtaining unit and a target determining unit configured to determine a target direction towards the target location from the terawatt femtosecond pulsed laser, wherein the tracking system is configured to:
  detect one or more respective locations of one or more objects in a field of regard, FOR, of the plasma burst application system; and
  determine whether a detected object is a target object or a protected object, the protected object being an object which is to be protected from laser pulses emitted by the plasma burst application system,
  wherein the one or more controllers are configured to receive the respective locations of the protected objects and to determine whether a laser pulse can be emitted or not based on the received respective locations of the protected objects, the determined target direction and the obtained target distance.

2. The plasma burst application system according to claim 1, wherein the system further comprises a laser pulse directing unit
  configured to receive the determined target direction and to direct laser pulses emitted by the terawatt femtosecond pulsed laser towards the target location based on the determined target direction, and/or
  wherein the filaments are plasma filaments.

3. The plasma burst application system according to claim 2, wherein the laser pulse directing unit is configured to:
  be in mechanical contact with the terawatt femtosecond pulsed laser and configured to move the terawatt femtosecond pulsed laser based on the determined target direction such that the laser pulses emitted by the terawatt femtosecond pulsed laser are directed towards the target location; and/or
  direct the emitted laser pulses using a movable laser pulse redirecting device.

4. The plasma burst application system according to claim 1, wherein the one or more controllers are configured to determine that a laser pulse can not be emitted when the respective locations of the protected objects are within a predetermined distance of a laser pulse path along which laser pulses emitted by the terawatt femtosecond laser travel towards the target location.

5. The plasma burst application system according to claim 4, further comprising a laser pulse collapse sensor configured to obtain a collapse distance of laser pulses emitted by the terawatt femtosecond pulsed laser, wherein the one or more controllers are configured to:
  receive the collapse distance;
  determine a difference between the collapse distance and the obtained target distance; and
  when the determined difference between the collapse distance and the obtained target distance exceeds a first threshold value, adapt the one or more laser control parameters such that the difference between the collapse distance and the obtained target distance is reduced,
  wherein the predetermined distance is reduced if the determined difference between the collapse distance and the obtained target distance is smaller than a second threshold value.

6. The plasma burst application system according to claim 1, wherein the tracking system comprises a light detection and ranging, LiDAR, device and/or a range gated viewing camera.

7. The plasma burst application system according to claim 1, wherein the one or more controllers are configured to:
  control a pulse repetition frequency of the terawatt femtosecond pulsed laser;
  obtain a radio frequency or radio frequency band to be disrupted; and
  control the pulse repetition frequency according to the determined radio frequency or radio frequency band thereby causing radio frequency transmitters and/or receivers operating with the obtained radio frequency or radio frequency band at the target location to be disrupted upon collapse of the laser pulse substantially at the target location.

8. The plasma burst application system according to claim 1, further comprising a laser pulse collapse sensor configured to obtain a collapse distance of laser pulses emitted by the terawatt femtosecond pulsed laser, wherein the one or more controllers are configured to:
  receive the collapse distance;
  determine a difference between the collapse distance and the obtained target distance; and
  when the determined difference between the collapse distance and the obtained target distance exceeds a first threshold value, adapt the one or more laser control parameters such that the difference between the collapse distance and the obtained target distance is reduced.

9. The plasma burst application system according to claim 8, wherein the laser pulse collapse sensor is configured to detect the plasma bursts caused by collapse of the laser pulses, wherein the collapse distance is obtained based on respective time-of-flights of laser pulses and corresponding respective plasma bursts.

10. The plasma burst application system according to claim 1, wherein the terawatt femtosecond pulsed laser comprises a femtosecond laser pulse generator for generating the femtosecond laser pulses.

11. The plasma burst application system according to claim 10, wherein the terawatt femtosecond pulsed laser further comprises:
  a defocusing lens for defocusing laser pulses emitted by the femtosecond laser pulse generator;
  a focusing lens for focusing the defocused laser pulses; and
  a distance adjuster for adjusting a distance between the defocusing lens and the focusing lens,
  wherein the laser control parameters comprise a distance between the focusing lens and the defocusing lens.

12. The plasma burst application system according to claim 10, wherein the terawatt femtosecond pulsed laser further comprises:
  a first optical element for separating a generated laser pulse into a plurality of spectral components;
  a spatial light modulator positioned to receive the spectral components and configured to spatially modulate the spectral components; and
  a second optical element for combining the modulated spectral components into a modulated laser pulse,
  wherein the laser control parameters comprise spatial modulation parameters of the spatial light modulator.

13. The plasma burst application system according to claim 12, wherein the first optical element is a first grating and the second optical element is a second grating, wherein the one or more controllers are configured to adapt respective first and second angles of the first and second gratings, wherein the laser control parameters comprise the first and second angles of respectively the first and second gratings.

14. The plasma burst application system according to claim 10, wherein the terawatt femtosecond pulsed laser further comprises a deformable mirror configured to alter a phase profile of a wavefront of generated laser pulses.

15. The plasma burst application system according to claim 1, the laser control parameters comprising at least one of a pulse duration, a pulse interval, pulse power, and pulse wavelength of the laser pulses.

16. The plasma burst application system according to claim 1, wherein the target distance is a distance between a reference point associated with a location of the terawatt femtosecond pulsed laser and the target location.

17. The plasma burst application system according to claim 1, wherein the system is mounted on a mobile platform.

18. The plasma burst application system according to claim 1, wherein the plasma burst application system is a drone disruption system.

19. The plasma burst application system according to claim 1, wherein the plasma burst application system is a radio frequency transmitter/receiver disruption system.

20. The plasma burst application system according to claim 1, wherein the plasma burst application system is a low energy plasma burst application system.

21. A mobile platform comprising a plasma burst application system according to claim 1.

22. A method for applying a plasma burst to a target object at a target location using a terawatt femtosecond pulsed laser in a system according to claim 1, the method comprising:
    determining, using the distance obtaining unit, a target distance between the terawatt femtosecond pulsed laser and the target location;
    setting one or more laser control parameters of the terawatt femtosecond pulsed laser according to the obtained target distance such that, when a laser pulse is emitted by the terawatt femtosecond pulsed laser, the laser pulse collapses at a laser pulse propagating distance substantially equal to the obtained target distance, and
    controlling the emission of at least one femtosecond laser pulse with associated filaments towards the target location such that the filaments of the at least one femtosecond laser pulse collapses at substantially the target location in order to apply the plasma burst at the target location.

23. The method of claim 22, further comprising disrupting an airborne electronic device using the terawatt femtosecond pulsed laser and directing a laser pulse from the laser towards the airborne electronic device, wherein the laser pulse collapses substantially at the electronic device and a plasma burst is applied substantially at the electronic device directing a laser pulse from the terawatt femtosecond pulsed laser towards the airborne electronic device wherein the laser pulse collapses substantially at the electronic device and a plasma burst is applied substantially at the electronic device.

24. The method of claim 22, further comprising disrupting radio frequency transmitters and/or receivers using the terawatt femtosecond pulsed laser and directing a laser pulse from the laser towards the radio frequency transmitters and/or receivers, wherein the laser pulse collapses substantially at the radio frequency transmitters and/or receivers and a plasma burst is applied substantially at the radio frequency transmitters and/or receivers directing a laser pulse from the terawatt femtosecond pulsed laser towards the airborne electronic device wherein the laser pulse collapses substantially at the electronic device and a plasma burst is applied substantially at the electronic device.

* * * * *